US010339151B2

(12) United States Patent
Nguyen et al.

(10) Patent No.: US 10,339,151 B2
(45) Date of Patent: Jul. 2, 2019

(54) CREATING FEDERATED DATA SOURCE CONNECTORS

(71) Applicant: Red Hat, Inc., Raleigh, NC (US)

(72) Inventors: Filip Nguyen, Brno (CZ); Filip Elias, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 710 days.

(21) Appl. No.: 14/628,578

(22) Filed: Feb. 23, 2015

(65) Prior Publication Data

US 2016/0246835 A1  Aug. 25, 2016

(51) Int. Cl.
G06F 16/25 (2019.01)
G06F 16/2458 (2019.01)

(52) U.S. Cl.
CPC ........ *G06F 16/2471* (2019.01); *G06F 16/256* (2019.01)

(58) Field of Classification Search
CPC ......... G06F 17/30566; G06F 17/30545; G06F 8/10; G06F 8/20; G06F 8/30; G06F 8/34; G06F 8/35; G06F 8/355; G06F 11/3457; G06F 11/3466; G06F 11/3608; G06F 11/3612; G06F 11/3636; G06F 11/3664; G06F 16/2471; G06F 16/256
See application file for complete search history.

(56) References Cited

U.S. PATENT DOCUMENTS

| 6,208,345 B1* | 3/2001 | Sheard ...................... G06F 8/34 |
| | | 709/201 |
| 6,996,806 B2* | 2/2006 | Bates ................... G06F 11/3664 |
| | | 714/E11.207 |
| 7,853,624 B2 | 12/2010 | Friedlander et al. |
| 8,126,870 B2 | 2/2012 | Chowdhuri et al. |
| 8,407,520 B2* | 3/2013 | Murphy .............. G06F 11/0709 |
| | | 714/26 |
| 8,442,999 B2 | 5/2013 | Gorelik et al. |
| 8,538,954 B2 | 9/2013 | George et al. |

(Continued)

OTHER PUBLICATIONS

Bowman, Ivan and Salem, Kenneth, School of Computer Science University of Waterloo, "Optimization of Query Streams Using Semantic Prefetching", https://cs.uwaterloo.ca/~kmsalem/pubs/BowmanSIGMOD04.pdf, Jun. 13-18, 2004, 12 pages.

(Continued)

*Primary Examiner* — Robert W Beausoliel, Jr.
*Assistant Examiner* — Arthur Ganger
(74) *Attorney, Agent, or Firm* — Lowenstein Sandler LLP

(57) ABSTRACT

A processing device translates a set of federated queries submitted to a federated data source server into a set of native data source queries for the particular type of data source using a federated data source connector for a particular type of data source, inputs the set of native data source queries for the particular type of data source into a component corresponding to the particular type of data source, marks the component in view of the set of native data source queries, and generates output indicating whether one or more of the set of native data source queries is not acceptable as input for the component. The marked component and the output indicate whether the federated data source connector for the particular type of data source includes an error.

20 Claims, 8 Drawing Sheets

(56) References Cited

U.S. PATENT DOCUMENTS

| | | | |
|---|---|---|---|
| 8,689,008 B2 | 4/2014 | Rangadass et al. | |
| 8,745,591 B2* | 6/2014 | De Smet | G06F 11/3636 717/125 |
| 8,805,716 B2* | 8/2014 | Michel | G06Q 10/067 705/7.39 |
| 2002/0133504 A1* | 9/2002 | Vlahos | G06F 17/30566 |
| 2008/0077560 A1* | 3/2008 | Comi | G06F 17/30404 |
| 2008/0134198 A1* | 6/2008 | Grasselt | G06F 17/30566 718/106 |
| 2008/0270980 A1* | 10/2008 | Ahadian | G06F 8/34 717/109 |
| 2008/0301135 A1* | 12/2008 | Alves | G06F 17/30442 |
| 2009/0030870 A1* | 1/2009 | Michailov | G06F 11/0769 |
| 2011/0088011 A1* | 4/2011 | Ouali | G06F 8/10 717/105 |
| 2011/0320238 A1* | 12/2011 | Niheu | G06Q 10/06 705/7.24 |
| 2012/0317096 A1* | 12/2012 | Kaufmann | G06F 17/30445 707/718 |
| 2013/0014088 A1* | 1/2013 | Park | G06F 11/3636 717/128 |
| 2013/0326471 A1* | 12/2013 | Nucci | G06F 8/10 717/105 |
| 2014/0129583 A1* | 5/2014 | Munkes | G06F 17/30967 707/760 |
| 2014/0214894 A1 | 7/2014 | Annapragada et al. | |
| 2014/0236983 A1* | 8/2014 | Alves | G06F 17/30548 707/769 |
| 2015/0172319 A1* | 6/2015 | Rodniansky | H04L 63/20 726/1 |
| 2017/0124146 A1* | 5/2017 | Lereya | G06F 17/30958 |

OTHER PUBLICATIONS

Sukheja, Deepak and Singh, Umesh, Priyatam Institute of Technology and Management Indore; Institute of Computer Science, Vikram University, Ujjain, "Query Optimizer Model for Performance Enhancement of Data Mining Based Query", http://csjournals.com/IJCSC/PDF1-1/52.pdf, Jan.-Jun. 2010, 3 pages.

Schmidt, Michael, et al., Fluid Operations AG, Walldorf, Germany; Institute for Web Science and Technology, University of Koblenz-Landau, Germany; Institute AIFB, Karlsruhe Institute of Technology, Germany, "FedBench: A Benchmark Suite for Federated Semantic Data Query Processing", http://iswc2011.semanticweb.org/fileadmin/iswc/Papers/Research_Paper/05/70310576.pdf, 2011, 16 pages.

Bent, Graham, et al., IBM, Emerging Technology Services, Hursley Park, MP137, Winchester, Hants. SO21 2JN, UK; City College of NY (CUNY), Convent Ave. at 138th St., NY, NY 10031, USA; Graduate Center, CUNY, 365 Fifth Avenue, New York, NY 10016, USA, "A Dynamic Distributed Federated Database", https://www.usukitacs.com/papers/3864/A%20Dynamic%20Distributibuted%20Federated%20Database.pdf, 8 pages.

* cited by examiner

| 401A | SELECT src.*  FROM invites src |
| 401B | SELECT a.foo FROM invites a WHERE a.ds='2008-08-15'; |
| 401C | SELECT src.key, src.value WHERE src.key >= 100 and src.key < 200 |
| 401D | SELECT COUNT(*) FROM u_data; |

CREATING FEDERATED DATA SOURCE CONNECTORS

TECHNICAL FIELD

The present disclosure relates to federated data source connectors, and more particularly, to creating federated data source connectors.

BACKGROUND

A federated database system is a type of meta-database management system, which can transparently map multiple different database systems into a single federated database. The federated database system interconnects many databases. Each connector is typically manually developed by a user (e.g., federated database system developer) for a particular type of database system. A connector may not be developed to fully support the functionality of the particular database system, for example, due to user error, and can limit the capabilities of the federated database system. Some of the database systems may not conform to a formal SQL specification, such as ANSI-SQL, and may utilize pseudo-SQL language. The development of a connector for such a database system can involve the uneasy task of the connector developer to verify generally every possible ANSI-SQL query, and the feasibility to use the possible queries in the pseudo-SQL language.

BRIEF DESCRIPTION OF THE DRAWINGS

The present disclosure will be understood more fully from the detailed description given below and from the accompanying drawings of various implementations of the disclosure.

DETAILED DESCRIPTION

Implementations of the present disclosure describe creating federated data source connectors. A federated data source system is a type of meta-database management system, which can transparently map multiple different data source systems into a single federated data source. A federated data source system is hereinafter referred to as a "federated database system" throughout this document. A database is used as an example of a data source throughout this document. The federated database system can include a heterogeneous collection of databases. When an application queries the federated database system, the federated database system can determine which database contains the data being requested and can send the application's query to the appropriate database. The federated database system can include a connector for each database system. The connectors can translate a query that is received at a federated database server into a query which the appropriate database system can process.

Each connector is typically manually developed by a user (e.g., federated database system developer) for a particular type of database system. A connector may not be developed to fully support the functionality of the particular database system, for example, due to user (e.g., developer) error. Some of the database systems may not conform to a formal SQL specification, such as ANSI-SQL, and may utilize pseudo-SQL language. The development of a connector for such a database system can involve a significant amount of time and resources for verifying every possible ANSI-SQL query, and the feasibility to use the possible queries in the pseudo-SQL language of the one or more database systems. Implementations of the present disclosure address the above deficiencies by providing tools to assess and increase the feature coverage of the database system connectors. The tools can reduce the amount of development time and resources for providing functionality of a connector by utilizing a directed graph, as described in greater detail below.

Figure 1:
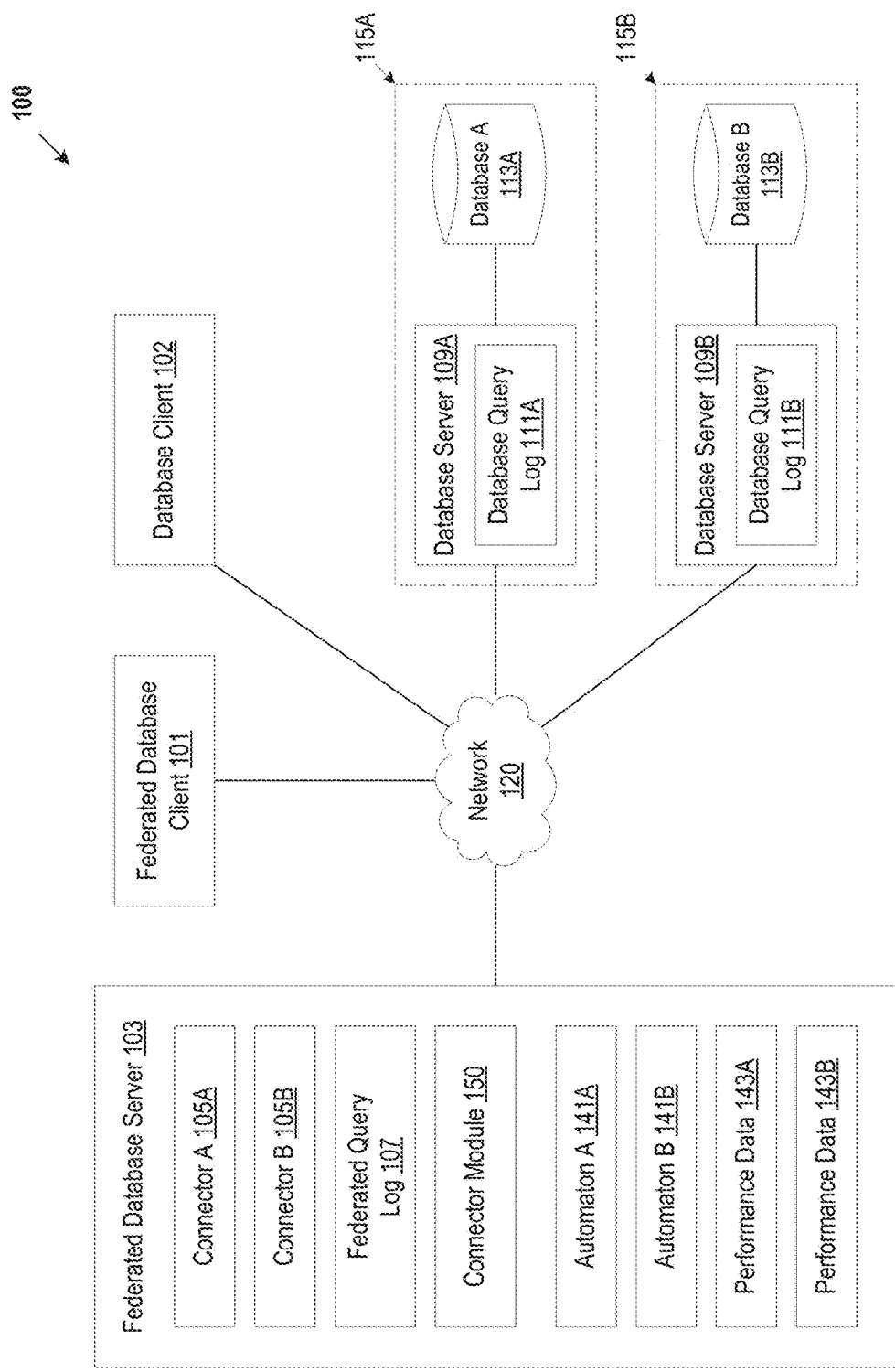
FIG. 1 illustrates an example system architecture, in accordance with various implementations.

FIG. 1 is an example system architecture 100 for various implementations. The system architecture 100 can include a federated database system. The federated database system can map multiple autonomous database systems 115A,B into a single federated database system. The system architecture 100 can include up to any number of database systems 115A,B. For simplicity and brevity, two database systems 115A,B are illustrated in system architecture 100. Each database system 115A,B can include a database 113A,B and a corresponding database server 109A,B.

The database systems 115A,B can support Structure Query Language (SQL) and SQL-like language (pseudo-SQL language) that is compatible with SQL. The database systems 115A,B can be heterogeneous. The system architecture 100 can include different types of database systems 115A,B that support SQL-like query semantics. Examples of the different types of database systems can include, and are not limited to, relational database management system (RDMBS), Apache Hive™, Cassandra Query Language (CQL), spreadsheets (e.g., Google Sheets™, Excel® spreadsheets), etc.

The single federated database system can include one or more federated database servers 103 that host data virtualization software to provide a single virtual database using the multiple database systems 115A,B. For simplicity and brevity, one federated database server 103 is illustrated in system architecture 100. A federated database server 103 can include a connector 105A,B for each database system 115A, B. In one implementation, there is a connector 105A,B for each type of database system 115A,B in the federated database system. For example, database system 115A may be an Apache Hive™ database system, and database system 115A may a Google Sheets' database system. Connector A 105A may correspond to database system 115A, and connector B 105B may correspond to database system 115B.

One or more federated database clients 101 can submit federated database queries to the federated database server 103. The federated database queries are submitted to the federated database server 103 using the federate query language. A federated database client 101 can host one or more applications. An application can be any type of application including, for example, a web application, a desktop application, a database management application, a browser application, etc. An application on the federated database client 101 can submit a federated database query to the federated database server 103. The federated database server 103 can identify which database system 115A,B contains the data being requested and can use the corresponding connector (e.g., connector 105A,B) to translate the federated database query from the federated query language into the language which the identified database system can process.

The federated database server 103 can include a connector module 150 to analyze the connectors 105A,B for improving the performance of the connectors 105A,B. The connector module 150 can create a component for each connector 105A,B. A component can be an automaton, such as a directed graph and a group of nodes. An automaton is used as an example of a component throughout this document. For example, the connector module 150 can create an automaton 141A,B for each connector 105A,B. An automaton can be a directed graph that includes state nodes to represent various states. In one implementation, an automaton for a connector for a particular type of database is a directed graph that contains state nodes to represent various query functions (e.g., SELECT, FROM, WHERE, COUNT, AND, EQUAL TO, GREATER THAN, etc.), and edges, lines, arrows, and/or text to represent transitions from state to state, as described in greater detail below in conjunction with FIGS. 2-5E.

The connector module 150 can use a database query log 111A,B of a database system 115A,B to create the component (e.g., automaton 141A,B) for the connector 105A,B for the database system 115A,B. Each database server 109A,B can generate and store a corresponding database query log 111A,B that includes native database queries that are received at the database server 109A,B. A native database query is a query that is submitted to the database server 109A,B and is in the query language that is supported by the database server 109A,B.

For example, database system 115A may be an Apache Hive database system. The Apache Hive database system can include an Apache Hive database server 109A and an Apache Hive database 113A. The Apache Hive database server 109A can receive native database queries that are in the pseudo-SQL language that is supported by the Apache Hive database system 115A and can store the native database queries in the database query log 111A. A database server 109A,B can store one or more database query logs 111A,B.

In one example, a database server 109A,B can receive native database queries from one or more database clients 102. The database clients 102 can submit native database queries to the database server 109A,B in the pseudo-SQL language that is supported by the database server 109A,B. In another example, a database server 109A,B can receive native database queries from the federated database server 103. As described above, one or more federated database clients 101 can submit federated database queries to the federated database server 103, and the federated database server 103 can identify which database system 115A,B contains the data being requested. The federated database server 103 can use the corresponding connector (e.g., connector 105A,B) to translate the federated database query from the federated query language into a native database query and submit the native database query to the appropriate database server 109A,B.

The database query logs 111A,B can include native database queries received from database clients 102 and/or the federated database server 103. The connector module 150 can use the native database queries in the database query logs 111A,B to create a component (e.g., automaton) for each database system 115A,B, as described in greater detail below in conjunction with FIGS. 3-5E.

The federated database server 103 can generate and store a federated query log 107 that includes federated database queries that are received from the federated database clients 101. As described above, a federated database query is a query that is submitted to the federated database server 103 in the federated query language.

The connector module 150 can use a set of federated queries from the federated query log 107 to compare a connector's (e.g., connector A 105A, connector B 105B) current implementation with the capabilities of the connector that are represented by a component (e.g., automaton A 141A, automaton B 141B) of the connector. The connector module 150 can create performance data 143A,B for a corresponding connector based on the comparison the connector's current implementation with the component (e.g., automaton) represented capabilities for the connector.

The performance data 143A,B for a connector 105A,B can include a marked component (e.g., automaton) for the connector and/or a list of queries that are not supported by the component (e.g., automaton 141A,B). For example, to evaluate connector B 105B for database system 115B, the connector module 150 can select one or more random federated queries from the federated query log 107 and translate the random federated queries, using connector B 105B, into native database queries for database system 115B. The connector module 150 can input the native database queries for database system 115B in the component (e.g., automaton B 141B) for connector B 105B and create a marked component (e.g., automaton) based on the input. If any of the native database queries for database system 115B are not accepted as valid input by the component (e.g., automaton B 141B), the connector module 150 can create a list of unsupported queries for the component (e.g., automaton). The creating of a marked component (e.g., automaton) and a list of unsupported queries for the component is described in greater detail below in conjunction with FIG. 2. The marked component and the list of unsupported queries for the component can indicate whether the corresponding connector includes an error, as described in greater detail below.

The federated database server(s) 103, the federated database client(s) 101, database clients 102, database systems 115A,B (e.g., database servers 109A,B and databases 113A, B) can be coupled to each other over one or more networks 120. The network 120 may be public networks (e.g., the Internet), private networks (e.g., a local area network (LAN) or wide area network (WAN)), or a combination thereof. The databases 113A,B can be geographically decentralized.

The federated database server 103, database servers 109A,B, database clients 102, and federated database clients 101 can be hosted on computing machines. The computing machines can be computing devices, such as server computers, desktop computers, set-top boxes, gaming consoles, televisions, portable computing devices such as, and not limited to, mobile telephones, personal digital assistants (PDAs), portable media players, netbooks, laptop computers, an electronic book reader, and the like.

The databases 113A,B can reside one or more data stores. A data store can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

Figure 2:
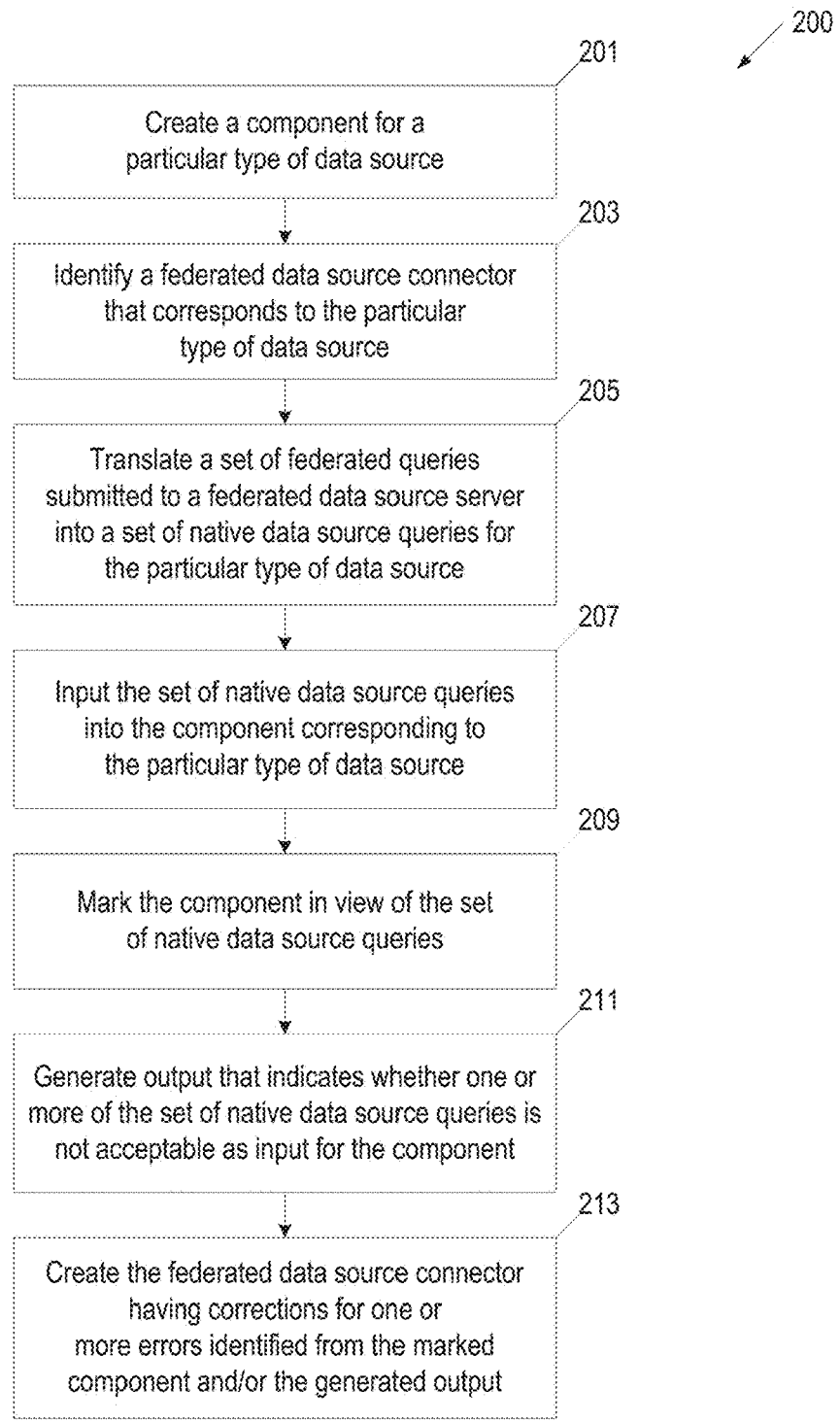
FIG. 2 is a flow diagram for a method for generating data for creating a federated data source connector for a particular data source, in accordance with one or more implementations of the present disclosure.

FIG. 2 is a flow diagram for a method 200 for generating data for creating a federated data source connector for a particular data source, in accordance with one or more implementations of the present disclosure. Method 200 can be performed by processing logic that can comprise hardware (e.g., circuitry, dedicated logic, programmable logic, microcode, etc.), software (e.g., instructions run on a processing device), or a combination thereof. In one implementation, method 200 is performed by a connector module (e.g., connector module 150 of FIG. 1) executing in a computing machine.

At block 201, the computing machine creates a component, such as an automaton (e.g., automaton 141A,B in FIG. 1), for a particular type of data source. The computing machine can create the component (e.g., automaton) for the particular type of data source using a database query log including one or more native source queries submitted to a data source server for the particular type of data source. The creating of a component (e.g., automaton) is described in greater detail below in conjunction with FIGS. 3-5E. Examples of types of data sources (e.g., databases) can include, and not limited to relational database management system (RDMBS), Apache Hive, Cassandra Query Language (CQL), spreadsheets (e.g., Google Sheets™, Excel® spreadsheets), etc. The particular type of data source can support a language compatible with structure query language. The component can be an automaton, such as a directed graph that includes state nodes to represent query functions (e.g., select, from, where, etc.). The component (e.g., automaton) can illustrate the syntax of the query language for the particular data source.

At block 203, the computing machine identifies a federated data source connector (e.g., connector 105A,B in FIG. 1) that corresponds to the particular type of data source. The federated data source server (e.g., federated database server 103 in FIG. 1) can include default federated data source connectors for various types of data sources, and one or more federated data source connectors that are developed by users and added to the federated database system. The computing machine can select the federated data source connector, from the default and/or user developed federated data source connectors, that corresponds to the component (e.g., automaton). For example, the computing machine creates an automaton for Apache Hive at block 201 and selects the Apache Hive connector at block 203.

At block 205, the computing machine translates a set of federated queries submitted to a federated data source server into a set of native data source queries for the particular type of data source. In one implementation, the computing randomly selects one or more federated queries from the federated query log in the federated data source server. The number of federated queries for the set can be based on configuration data that is stored in a data store. The number of federated queries can be a configurable and/or user-defined value. In one implementation, the computing machine selects a set of federated queries that includes certain query functions (e.g., select, from, where, etc.) as specified in the configuration data.

The computing machine can select the federated data source connector (e.g., Apache Hive connector) for the particular type of data source (e.g., Apache Hive) and use the selected connector for the translation. The federated queries are in a federated query language (e.g., SPARQL (SPARQL Protocol and RDF Query Language)), and the selected connector can translate the federated queries into native data source queries that can be processed by the particular database system (e.g., Apache Hive database system).

At block 207, the computing machine inputs the set of native data source queries for the particular type of data source into the component (e.g., automaton) that corresponds to the particular type of data source, and marks the component (e.g., automaton) in view of the set of native data source queries at block 209. The component can be an automaton that is a directed graph that includes state nodes to represent query functions (e.g., select, from, where, etc.). As each native data source query in the set of native data source queries is applied to the automaton, the computing machine can mark the state nodes in the automaton that correspond to the functions in each native data source query. Examples of marking can include, and are not limited to, coloring a state node, highlighting a state node, applying a pattern to a state node, and adding an indicator to a state node.

After inputting the set of native data source queries into the component (e.g., automaton), the marked component (e.g, automaton) can include one or more marked state nodes. For example, the computing machine inputs the set of native data source queries for the Apache Hive database system into the Apache Hive automaton. One of the native Apache Hive data source queries may include a SELECT function and a FROM function, and the computing machine can color a state node in the Apache Hive automaton that corresponds to the SELECT function and can color a state node in the Apache Hive automaton that corresponds to the FROM function.

After inputting the set of native data source queries into the component (e.g., automaton), the marked component (e.g., automaton) can include one or more unmarked state nodes. For example, the Apache Hive automaton may include a state node for a COUNT function, and the set of native data source queries for the Apache Hive database system may not include any native data source queries that have a COUNT function.

At block 211, the computing machine generates output that indicates whether one or more of the set of native data source queries is not acceptable as input for the component (e.g., automaton). For example, the output may include one or more of the set of native data source queries that contain a function that is not represented by a corresponding state node in the automaton.

When each of the native data source queries in the set of native data source queries is applied to the component (e.g, automaton), one or more of the native data source queries may not be accepted as valid input for the component (e.g, automaton). For example, one or more of the native data source queries may include an XYZ function, and the Apache Hive automaton may not have a state node for the XYZ function. The computing machine can generate a processing error when inputting a native data source query that includes the XYZ function into the Apache Hive automaton. The computing machine can generate output indicating the one or more native data source queries that are not acceptable as input for the component (e.g, automaton). The output can be a list of the one or more native data source queries that are not acceptable as input for the component (e.g., automaton).

At block 213, the computing machine creates the federated data source connector having corrections for one or more errors identified from the marked component (e.g., automaton) and/or the output. The computing machine can provide the marked component (e.g., automaton) and the output to a user (e.g., connector developer).

The marked component can indicate whether the federated data source connector for the particular type of data source includes an error. A user can use the marked component to analyze the connector and to determine one or more changes for connector to correct the error(s). For example, the marked component can include one or more unmarked state nodes. For example, the Apache Hive automaton may include a state node for a COUNT function, and the set of native data source queries for the Apache Hive database system may not include any native data source queries that have a COUNT function. The set of federated queries that were translated at block 205 may include one or more federated queries that have the COUNT function, and the connector may not have correctly translated the COUNT function from the federated query language to the COUNT function in the native (e.g., Apache Hive query language) query language, resulting in the state node for the COUNT function remaining unmarked in the automaton. The Apache Hive automaton can be modified to correctly translate the COUNT function from the federated query language to the COUNT function in the native (e.g., Apache Hive query language) query language.

The output (e.g., list) of unaccepted native data source queries can indicate whether the federated data source connector for the particular type of data source includes an error. A user can use the output of unaccepted native data source queries to analyze the connector and to determine one or more changes for connector to correct the error(s). For example, Apache Hive may not support XYZ function, and the Apache Hive automaton may not include a state node to represent XYZ function. There may be a user-based error in the Apache Hive connector causing the Apache Hive connector to mistakenly translate the XYZ function from the federated query language to an XYZ function in the native Apache Hive query language, resulting in native source query not being accepted by the Apache Hive automaton. The Apache Hive automaton can be modified to not translate any XYZ functions from the federated query language to an XYZ function in the native Apache Hive query language, resulting the respective native data source queries being accepted by the Apache Hive automaton.

In one implementation, the computing machine receives user input for modifying the federated data source connector for the particular type of data source to correct one or more errors identified from the marked component (e.g., automaton) and/or output of unaccepted native data source queries. In one implementation, the computing machine modifies the federated data source connector in view of the user input.

In one implementation, the computing machine iterates through at least a portion of method 200 based on the number of connectors in the federated database system. In one implementation, the set of federated queries is periodically updated, and the computing machine performs at least a portion of method 200 in response to the set of federated queries being updated. For example, the computing machine periodically marks the component (e.g., automaton) and/or generates the output in view of an updated set of federated queries. In one implementation, a component (e.g., automaton) is periodically updated, and the computing machine performs at least a portion of method 200 in response to the component (e.g., automaton) being updated.

Figure 3:
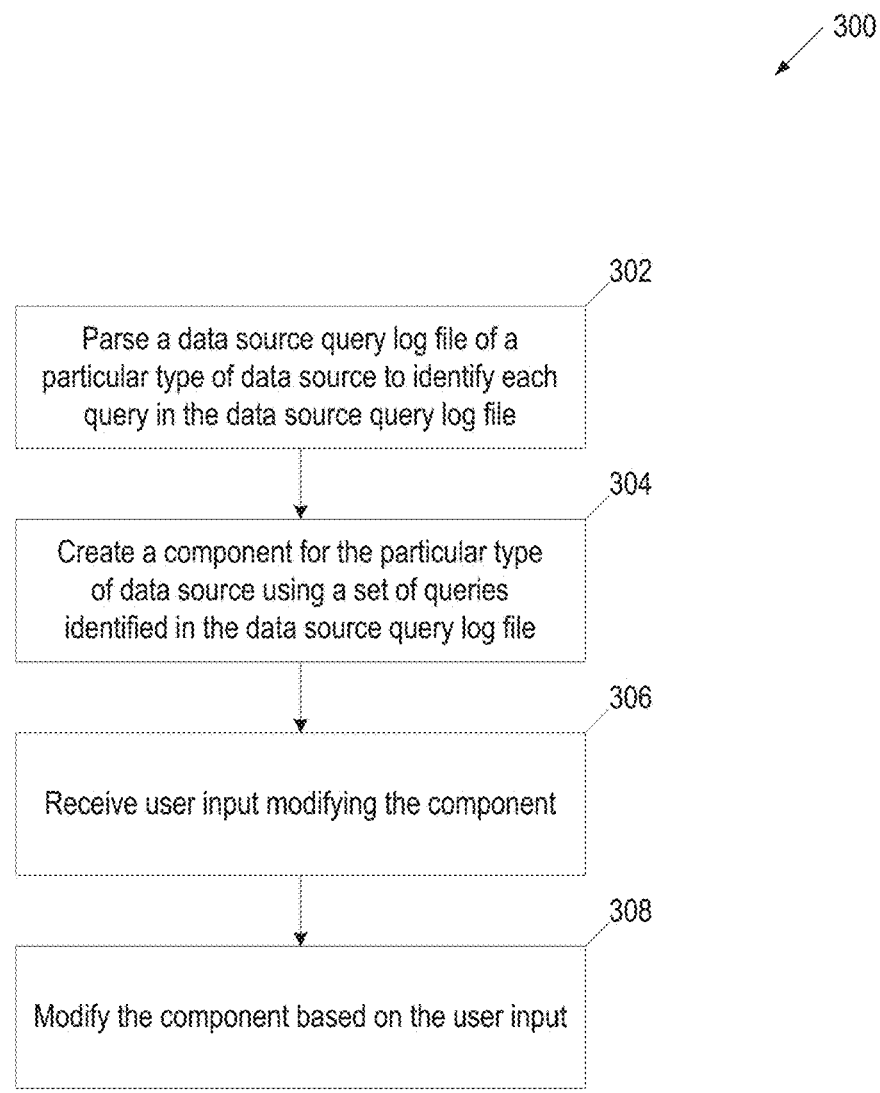
FIG. 3 is a flow diagram for a method for creating a component for a particular type of data source, in accordance with one or more implementations of the present disclosure.

FIG. 3 is a flow diagram for a method 300 for creating a component for a particular type of data source, in accordance with one or more implementations of the present disclosure. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by a connector module (e.g., connector module 150 of FIG. 1) executing in a computing machine.

At block 302, the computing machine parses a data source query log file of a particular type of data source to identify each query in the data source log file. As described above, a data source server (e.g., database server 105A,B in FIG. 1) can include one or more data source query log files (e.g., database query log 111A,B in FIG. 1). The data source query log files can include native data source queries that have been submitted to the data source server.

In one implementation, the computing machine parses a portion of the data source query log file to identify each query in the portion. In one implementation, the portion represents the native data source queries that have submitted to the data source server for a time period (e.g., last 24 hours). The time period can be based on configuration data that is stored in a data store. The time period can be a configurable and/or user-defined value.

At block 304, the computing machine creates a component (e.g., automaton) for the particular type of data source using a set of queries identified in the data source query log file. In one implementation, the set of queries includes all of the identified native data source queries in the log file. In one implementation, the set of queries includes a certain variety of query functions (e.g., select, from, where, etc.) from the identified native data source queries in the log file.

The computing machine identifies the query functions in the each of the set of native data source queries and creates state nodes in the component (e.g., automaton) to represent the query functions. The computing machine creates edges, lines, text, etc. to interconnect the state nodes to represent transitions from state to state in the component (e.g., automaton).

Figure 4:
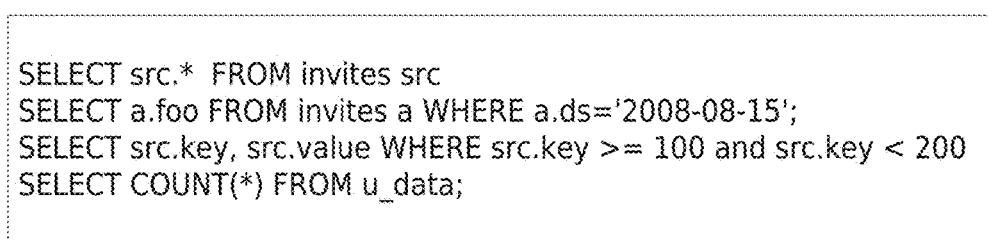
FIG. 4 illustrates an example data source query log file, in accordance with one or more implementations of the present disclosure.

FIG. 4 illustrates an example data source query log file 400, in accordance with one or more implementations of the present disclosure. For brevity and simplicity, the data source query log file 400 includes four native data source queries 401A-D. In one implementation, the computing machine processes the set of native data source queries one native data source query at a time to create the component (e.g., automaton).

Figure 5A:
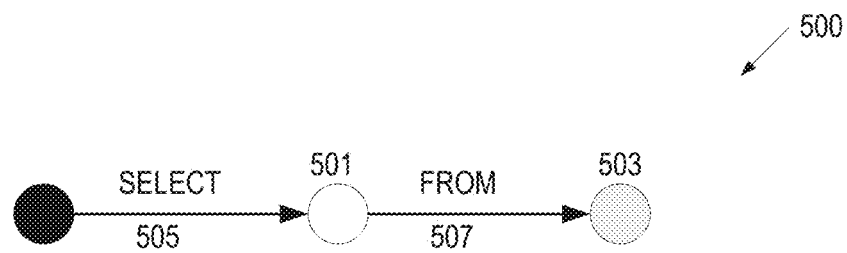
FIGS. 5A-5E illustrate an example automaton from processing one or more native data source queries, in accordance with one or more implementations of the present disclosure.

FIGS. 5A-5E illustrate an example automaton 500 from processing one or more native data source queries, in accordance with one or more implementations of the present disclosure. For example the native data source query 401A in FIG. 4 includes a SELECT function and a FROM function, and the computing machine creates a state node 501 and an edge 505 for the SELECT function, and a state node 503 and an edge 507 for the FROM function in the automaton 500, as illustrated in FIG. 5A.

Figure 5B:
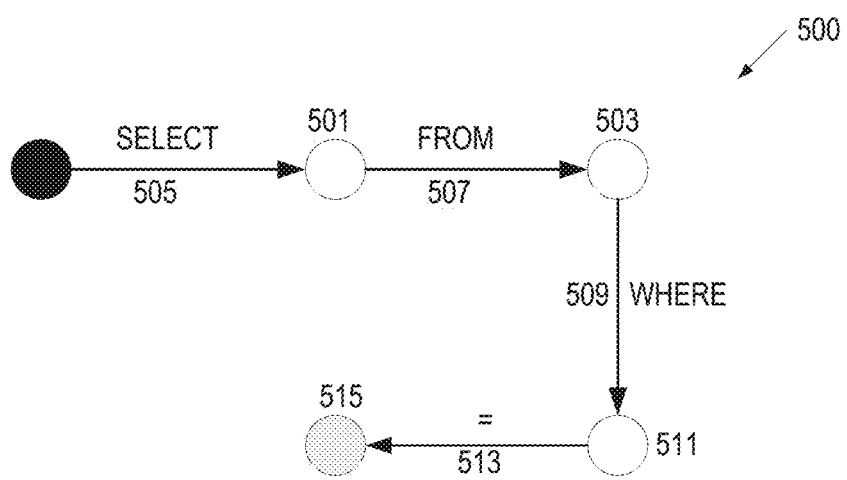

The native data source query 401B includes a SELECT function, a FROM function, a WHERE function, and an EQUAL function. The computing machine creates a state node 511 and an edge 509 for the WHERE function, and a state node 515 and an edge 513 for the EQUAL function in the automaton 500, as illustrated in FIG. 5B. In one implementation, an automaton includes one state node per function type. In one implementation, the computing machine identifies new functions (functions not already represented in the automaton) when processing each native data source query.

Figure 5C:
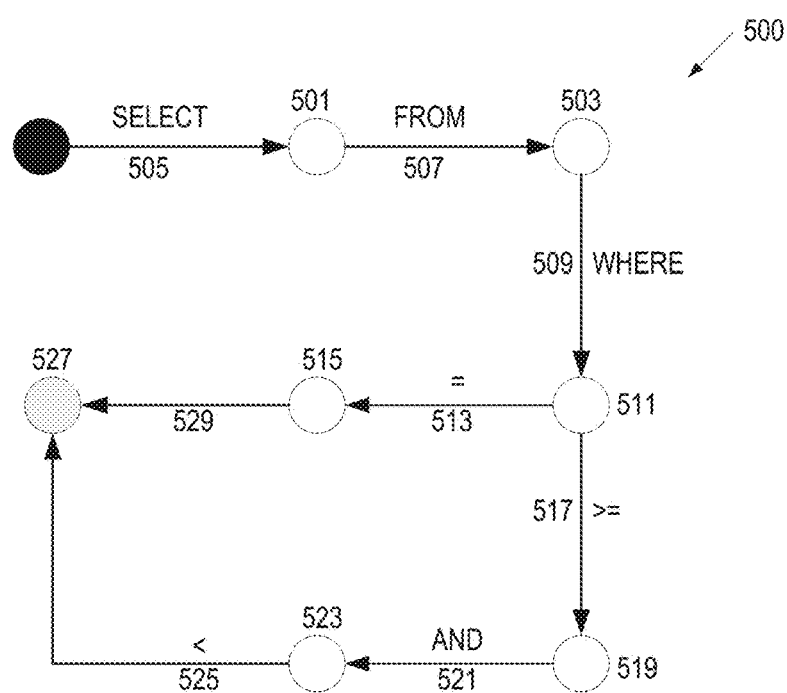
Figure 5D:
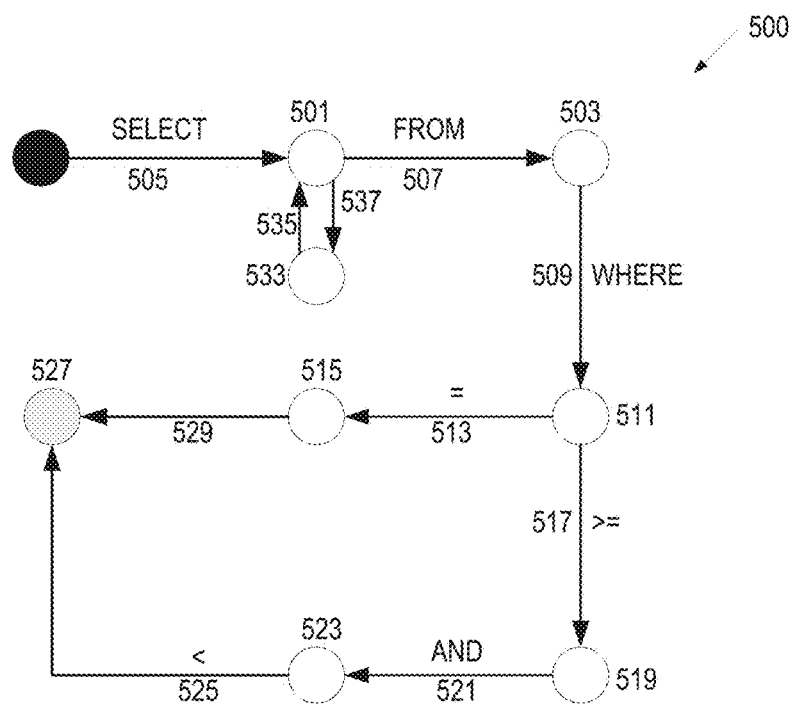

The new functions in the native data source query 401C include a GREATER THAN or EQUAL TO function, an AND function, and a LESS THAN function. The computing machine creates a state node 519 and an edge 517 for the GREATER THAN or EQUAL TO function, a state node 523 and an edge 521 for the AND function, and a state node 527 and an edge 525 for the LESS THAN function in the automaton 500, as illustrated in FIG. 5C. In one implementation, an automaton includes a transition edge 529 for transitioning from one state node to another state node. The new function in native data source query 401D includes a COUNT function. The computing machine creates a state node 533 and edges 535,537 for the COUNT function in the automaton 500, as illustrated in FIG. 5D.

Figure 5E:
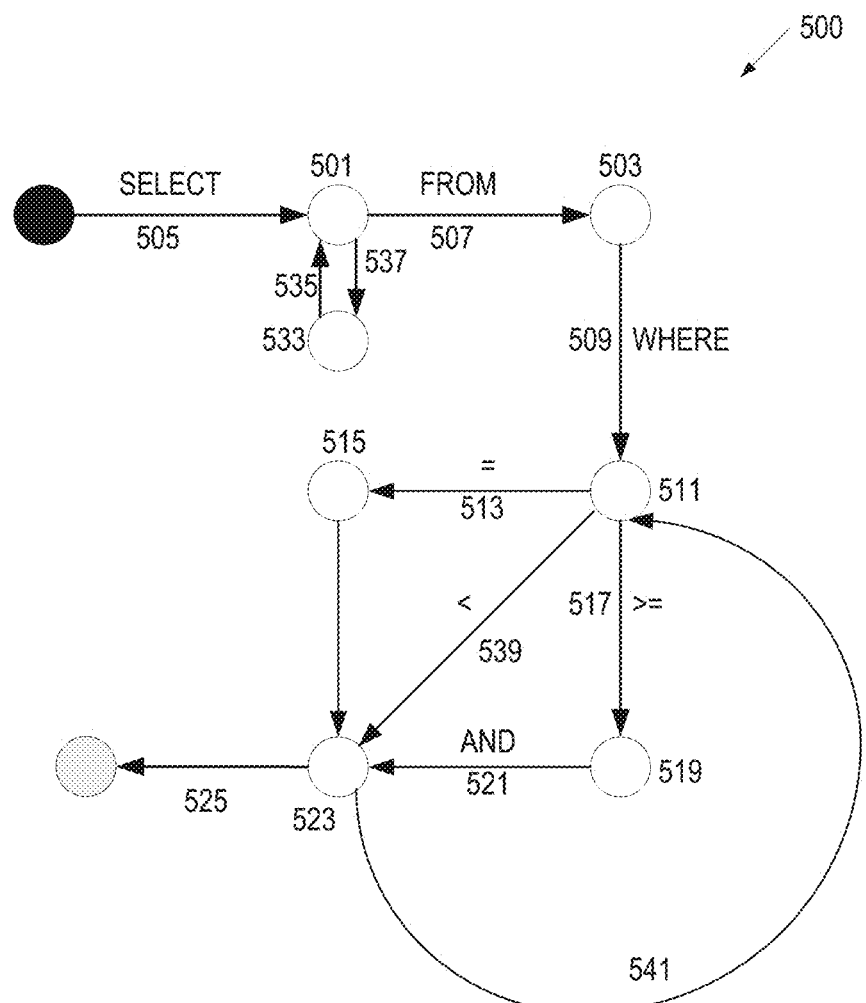

Referring to FIG. 3, at block 306, the computing machine optionally receives user input modifying the automaton (e.g., automaton 500 in FIGS. 5A-D) and modifies the automaton based on the user input at block 308. A user (e.g., connector developer) can use documentation (e.g., native query language documentation) to uncover query features and/or query functions that may not be determined by the computing machine from using the data source log files. For example, the user input may add representations for recursive repetition of certain elements (e.g., AND OR operations, parentheses) to the automaton. FIG. 5E illustrates an example automaton 500 after processing one or more native data source queries and receiving user input modifying the automaton, in accordance with one or more implementations of the present disclosure. The computing machine adds edge 539 and edge 541 to the automaton 500 based on received user input, and/or removes one or more edges (e.g., edges 525,529).

Figure 6:
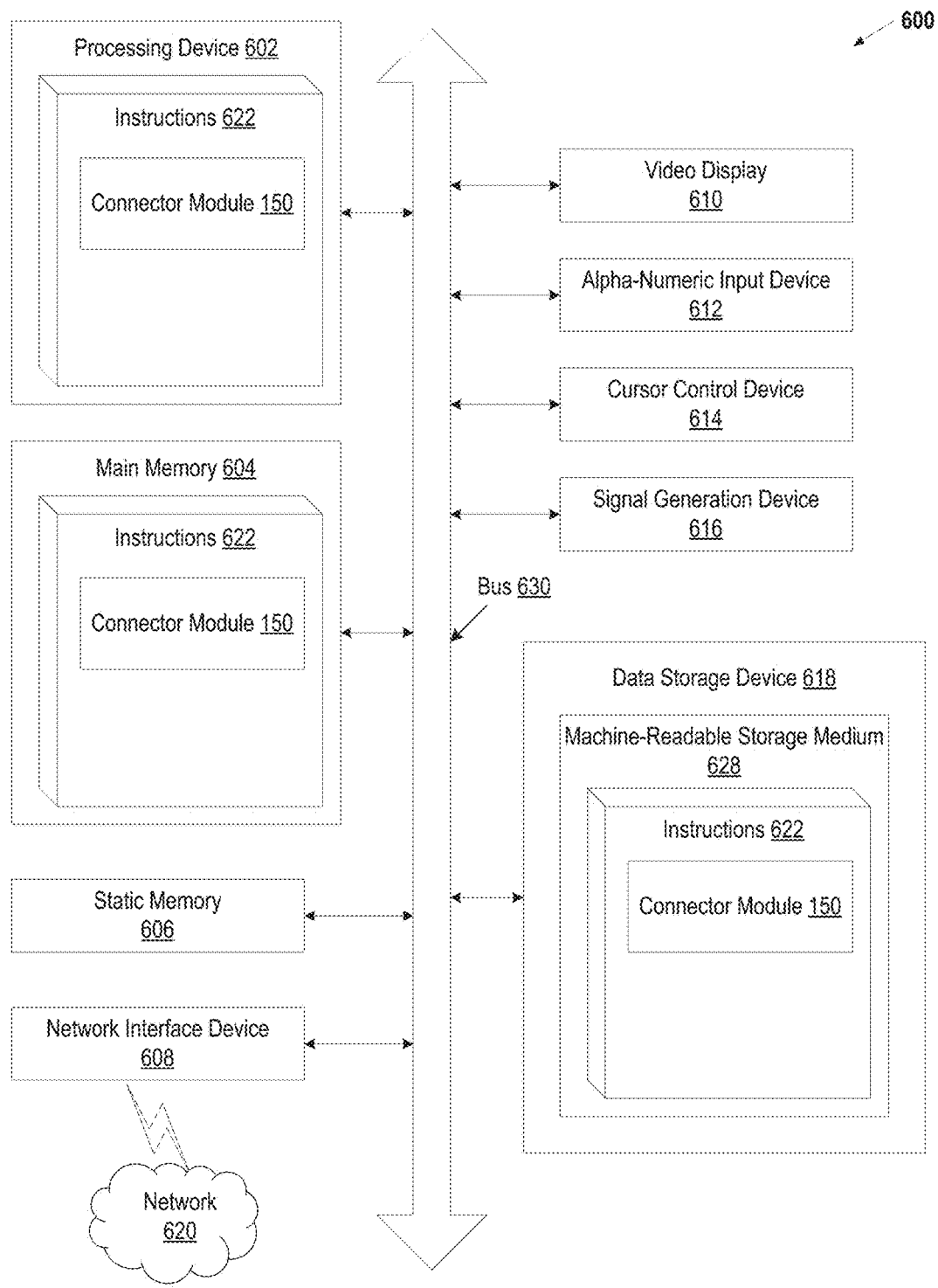
FIG. 6 is a block diagram of an example computer system that may perform one or more of the operations described herein.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data store device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT), an alphanumeric input device 612 (e.g., a keyboard), a cursor control device 614 (e.g., a mouse), and a signal generation device 616 (e.g., speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a connector module (e.g., connector module 150 of FIG. 1), and/or a software library containing methods that call the connector module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "translating" or "inputting" or "marking" or "generating" or "causing" or "creating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   translating, using a federated data source connector for a particular type of data source, a set of federated queries submitted to a federated data source server into a set of native data source queries for the particular type of data source;
   inputting the set of native data source queries for the particular type of data source into a component corresponding to the particular type of data source, the component comprising a directed graph having a group of nodes to represent the set of native data source queries;
   marking, by a processing device, the component in view of inputting the set of native data source queries into the component, wherein the marked component indicates whether the federated data source connector for the particular type of data source comprises an error;
   generating first output indicating whether one or more queries of the set of native data source queries is not acceptable as input for the marked component, wherein the first output indicates whether the federated data source connector for the particular type of data source comprises an error; and
   generating second output comprising a list of unsupported queries of the marked component, the list of unsupported queries comprising the one or more queries of the set of native data source queries that are not acceptable as input for the marked component.

2. The method of claim 1, wherein:
   the one or more queries of the set of native data source queries that are not acceptable as input for the marked component comprise a function that is not represented by a corresponding state node in the marked component.

3. The method of claim 1, wherein marking the component comprises:
   for each native data source query in the set of native data source queries, marking one or more state nodes in the component that correspond to one or more functions in the native data source query.

4. The method of claim 1, further comprising:
   causing one or more modifications to the federated data source connector to correct one or more errors identified from at least one of the marked component or the output.

5. The method of claim 1, further comprising at least one of:
   periodically marking the component or periodically generating the output in view of an updated set of federated queries.

6. The method of claim 1, further comprising:
   creating the component for the particular type of data source using a database query log including one or more native source queries submitted to a data source server for the particular type of data source.

7. The method of claim 1, wherein the particular type of data source supports a language compatible with structure query language.

8. A non-transitory computer-readable storage medium including instructions that, when executed by a processing device, cause the processing device to:
   translate, using a federated data source connector for a particular type of data source, a set of federated queries submitted to a federated data source server into a set of native data source queries for the particular type of data source;
   input the set of native data source queries for the particular type of data source into a component corresponding to the particular type of data source, the component comprising a directed graph having a group of nodes to represent the set of native data source queries;
   mark the component in view of the input of the set of native data source queries into the component, wherein the marked component indicates whether the federated data source connector for the particular type of data source comprises an error;
   generate first output indicating whether one or more queries of the set of native data source queries is not acceptable as input for the marked component, wherein the first output indicates whether the federated data source connector for the particular type of data source comprises an error; and generate second output comprising a list of unsupported queries of the marked component, the list of unsupported queries comprising the one or more queries of the set of native data source queries that are not acceptable as input for the marked component.

9. The non-transitory computer-readable storage medium of claim 8, wherein:
the one or more queries of the set of native data source queries that are not acceptable as input for the marked component comprise a function that is not represented by a corresponding state node in the marked component.

10. The non-transitory computer-readable storage medium of claim 8, wherein to mark the component comprises the processing device to:
for each native data source query in the set of native data source queries, mark one or more state nodes in the component that correspond to one or more functions in the native data source query.

11. The non-transitory computer-readable storage medium of claim 8, wherein the processing device is further to:
cause one or more modifications to the federated data source connector to correct one or more errors identified from at least one of the marked component or the output.

12. The non-transitory computer-readable storage medium of claim 8, wherein the processing device is further to at least one of:
periodically mark the component or periodically generate the output in view of an updated set of federated queries.

13. The non-transitory computer-readable storage medium of claim 8, wherein the processing device is further to:
create the component for the particular type of data source using a database query log including one or more native source queries submitted to a data source server for the particular type of data source.

14. The non-transitory computer-readable storage medium of claim 8, wherein the particular type of data source supports a language compatible with structure query language.

15. A system comprising:
a memory;
a processing device coupled to the memory to:
translate, using a federated data source connector for a particular type of data source, a set of federated queries submitted to a federated data source server into a set of native data source queries for the particular type of data source;
input the set of native data source queries for the particular type of data source into a component corresponding to the particular type of data source, the component comprising a directed graph having a group of nodes to represent the set of native data source queries;
mark the component in view of the input of the set of native data source queries into the component, wherein the marked component indicates whether the federated data source connector for the particular type of data source comprises an error;
generate first output indicating whether one or more queries of the set of native data source queries is not acceptable as input for the marked component, wherein the first output indicates whether the federated data source connector for the particular type of data source comprises an error; and
generate second output comprising a list of unsupported queries of the marked component, the list of unsupported queries comprising the one or more queries of the set of native data source queries that are not acceptable as input for the marked component.

16. The system of claim 15, wherein:
the one or more queries of the set of native data source queries that are not acceptable as input for the marked component comprise a function that is not represented by a corresponding state node in the marked component.

17. The system of claim 15, wherein to mark the component comprises the processing device to:
for each native data source query in the set of native data source queries, mark one or more state nodes in the component that correspond to one or more functions in the native data source query.

18. The system of claim 15, wherein the processing device is further to:
cause one or more modifications to the federated data source connector to correct one or more errors identified from at least one of the marked component or the output.

19. The system of claim 15, wherein the processing device is further to at least one of:
periodically mark the component or periodically generate the output in view of an updated set of federated queries.

20. The system of claim 15, wherein the processing device is further to:
create the component for the particular type of data source using a database query log including one or more native source queries submitted to a data source server for the particular type of data source.

* * * * *